Sept. 2, 1958  DE LANE W. BRECHWALD  2,850,221
ARTICLE CARRIER FOR BICYCLES

Filed March 29, 1957  2 Sheets-Sheet 1

INVENTOR.
DE LANE W. BRECHWALD,
BY
McMorrow, Berman + Davidson
ATTORNEYS.

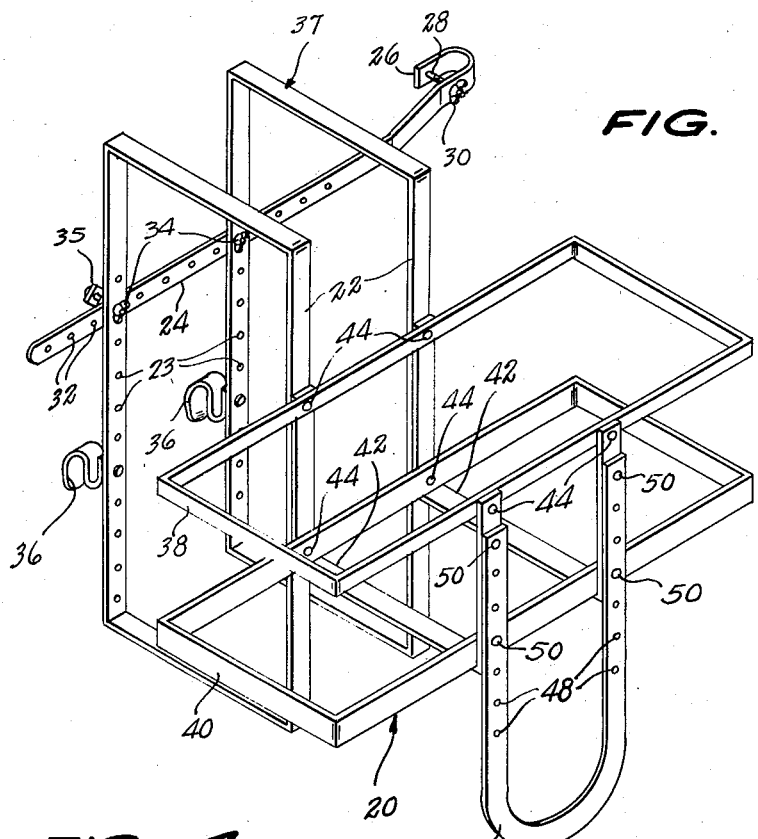

2,850,221

ARTICLE CARRIER FOR BICYCLES

De Lane W. Brechwald, Shenandoah, Iowa

Application March 29, 1957, Serial No. 649,507

3 Claims. (Cl. 224—32)

This invention relates to bicycle attachments. More particularly, the invention has reference to a carrier or basket attachment for a bicycle, designed particularly for holding loaded newspaper bags, although not necessarily restricted to this particular use.

It is known that for a substantial period of time, there has been a clear and important need for an improved means for carrying a loaded bag of newspapers upon a bicycle. Newspaper delivery boys use various, haphazard methods or expedients for carrying a loaded bag of newspapers. In some instances, the newspaper boy may sling the bag from his shoulders, which is not only uncomfortable and inconvenient, but prevents one from maintaining proper balance while riding the bicycle. It is, perhaps more common to utilize baskets of different kinds. It has been found that such baskets as are commercially available have been unsatisfactory as carriers for loaded bags of newspapers or other large, irregularly shaped articles. Such baskets as are large enough to hold a bag full of newspapers are so mounted as to require that they be left upon the bicycle continuously. Usually, such baskets are mounted in front, on the axle and handle bars. It has been noted that a small basket is not of a size sufficient to hold a loaded newspaper bag, while a large basket is far too cumbersome and heavy.

Further, due to the fact that the center of gravity is caused to be high upon the bicycle in an arrangement as described immediately above, it is difficult to steer properly and not uncommonly, the rider spills. Such baskets as are known and are mounted in the rear are small, and have been found to be almost useless for holding a large quantity of newspapers.

In view of the above, the main object of the present invention is to eliminate the several deficiencies noted in connection with conventional practice, through the provision of a carrier that will be mounted upon the bicycle at a relatively low elevation so as to keep the center of gravity as near to the support surface as possible; will be so formed as to be quickly attachable or detachable, so that the newspaper carrier boy can use his bicycle when not delivering newspapers without being encumbered by a basket of any sort; will be durable; will be designed so as to be readily attachable to any and all commercially known bicycles regardless of the frame construction, size of tubing and design; will be mountable on either the right or left side of the bicycle without modification of the device; will be so formed as not to interfere in any way with normal operation of the bicycle; and will include a framing member that will extend downwardly from the basket at a location laterally spaced a substantial distance from the bicycle, in a manner to provide a stand for the bicycle.

Other objects will appear from the following description, the claims appended thereto, and from the annexed drawing, in which like reference characters designate like parts throughout the several views, and wherein:

Figure 3 is an enlarged perspective view of the carrier attachment per se;

Figure 4 is an enlarged, detail sectional view on line 4—4 of Figure 1;

Figure 5 is an enlarged, detail sectional view substantially on line 5—5 of Figure 1; and Figure 6 is a detail sectional view on line 6—6 of Figure 1.

Figure 1:
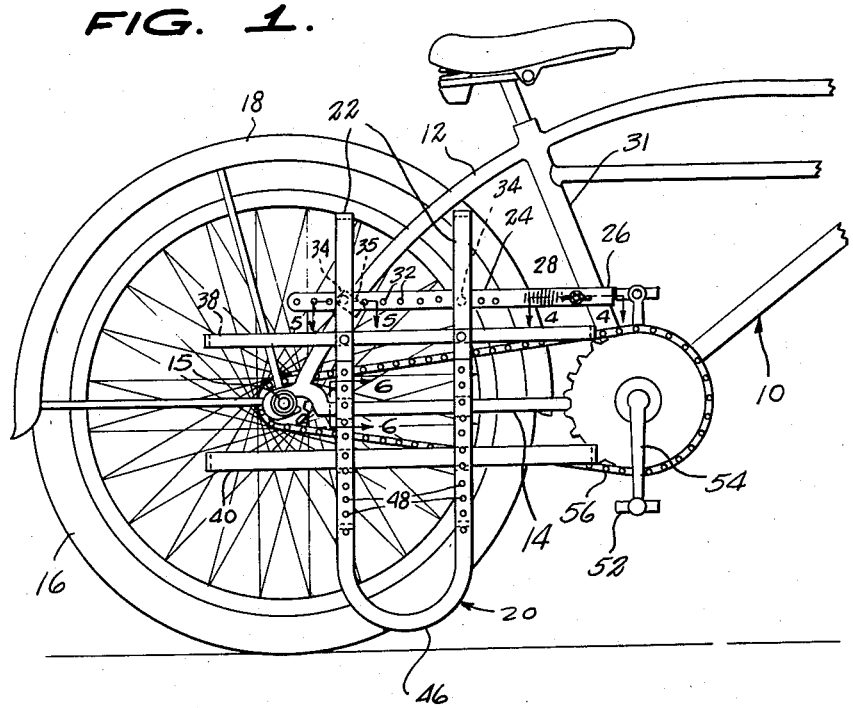
Figure 1 is a fragmentary side elevational view of a conventional bicycle, equipped with a carrier attachment according to the invention, said attachment being shown in side elevation.
Figure 2:
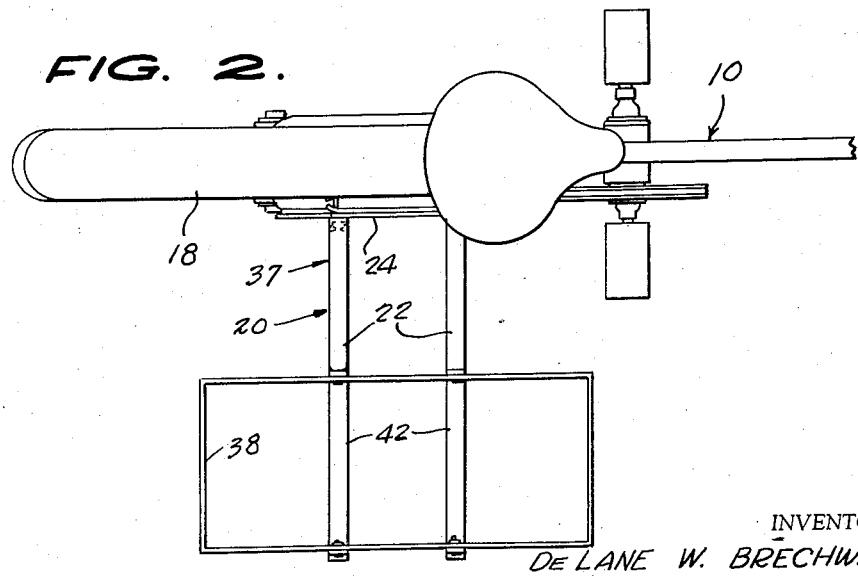
Figure 2 is a fragmentary top plan view of a bicycle in which the carrier attachment is illustrated in top plan.

Illustrated in Figures 1 and 2 is a conventional bicycle generally designated 10, the frame of which includes the usual rear fork having the rear upper stays 12 and rear lower stays 14. Rotatable within the rear fork upon rear axle 15 is the rear wheel 16, over which extends the rear fender 18.

The carrier 20 constituting the invention includes a pair of identical, spaced, rectangular frame members 22 of rigid strap metal or other suitable stock, disposed in parallel, vertical planes intersecting perpendicularly with the general plane of the bicycle when the device is attached to the bicycle (see Figure 2).

A mounting arm 24 extends horizontally in a fore-and-aft direction, and has at its forward end a rearwardly opening, U-shaped clamp member 26 offset laterally from the length of the mounting arm in a direction opposite to that in which the frame members 22 extend from the mounting arm. A clamping bolt 28 extends through transversely aligned openings provided in the legs of the clamp member 26, and a wing nut 30 is applied to the bolt 28 for tightening said clamp member about the adjacent frame member or rear frame portion 31 of the bicycle.

As will be seen from Figure 3, formed in the sides of the frame members 22 that are adjacent the bicycle wheel are uniformly spaced openings 23, the openings 23 of each member 22 extending in a continuous series from the lower end of the member 22 to a location adjacent the upper end thereof. Any opening 23 is adapted to be registered with any of a plurality of openings 32 formed in a longitudinal series in the mounting arm 24. This permits bodily adjustment of the frame members 22 in a fore-and-aft direction in respect to the bicycle, so as to correspondingly adjust the article-receiving basket of the device. Further, vertical adjustment of the basket and of the framing members 22 is permitted, in any position to which said members are adjusted in the mentioned fore-and-aft direction.

The members 22 are connected to the mounting arm 24 by bolts 34 that extend through the registered openings 23, 32, as shown in Figure 5, and wing nuts are applied to the bolts 34. One of the bolts 34 passes also through a U-shaped clamp bracket 35, so that said bracket may be tightened to the upper rear stay 12.

Spaced downwardly from the mounting arm 24, upon the frame members 22, are S-shaped rests 36, which can be attached to the members 22 in any selected position of adjustment vertically of the members, by bolts passing through selected ones of the openings 23.

The rests 36 are adapted to receive and be supported upon the lower rear stay 14 as shown in Figure 6.

The components 22–36 inclusive cooperate to define a support frame generally designated 37, that is adapted to support the remaining components of the device, to be described hereinafter, laterally outwardly from the bicycle.

There will now be described the basket. While this is shown as an open framework in the illustrated embodiment of the invention, it could obviously be a completely closed receptacle. Further, the particular shape of the receptacle can be varied as desired.

In the presently preferred embodiment, the basket includes vertically spaced, rectangular basket frame members 38, 40 disposed in horizontal planes. Embracing and fixedly connecting the basket frame members 38, 40 are U-shaped braces 42 connected by bolts 44 or equivalent means to the outer sides of the support frame members 22. To the outer sides of the braces 42 there are connected the legs of a U-shaped stand 46 that extends downwardly from the basket so that when the rider dismounts from the bicycle, it will tilt transversely in a direction toward the side on which the device is mounted, with the weight of the device being adapted to cause the bicycle to tilt in this direction, thus causing the stand to engage the supporting surface. Subsequently, when the bicycle is again being ridden, the stand will spaced upwardly from the supporting surface a distance sufficient to assure safe operation of the vehicle.

Formed in the legs of the stand are openings 48 selective ones of which are adapted to receive bolts 50 or equivalent fastening elements that fixedly attach the stand to the adjacent outer legs or sides of the braces 42.

As previously mentioned, instead of an open basket of the type illustrated, the basket could be a fully enclosed box. In the illustrated example, which has been found to work with full efficiency in supporting loaded bags of newspapers, the braces 42 provide a bottom for the basket and the members 38, 40 provide sides for the basket in cooperation with the legs of the braces 42.

The device is characterized by its adaptability to be swiftly attached to or detached from any conventional bicycle. One makes only a two-point connection to the bicycle, that is, at the points denoted by the rearwardly opening clamp member 26 and the clamp 35. Thus one need merely, after having adjusted the device to fit the particular bicycle and the particular desires of the user, position the rest 36 over the lower rear stay 14 at the selected side of the vehicle. Then the device, with the bolt 28 and the left hand bolt 34 (viewing the same as in Figure 3) removed, is shifted bodily in a rearward direction, causing clamps 26 to receive the frame member 31 while clamp 35 at the same time receives the rear, upper stay 12. The bolts are then replaced and the wing nuts thereof tightened to complete the mounting of the device on the bicycle. When the device is mounted, it will not slip downwardly due to the fact that the conventional components 31, 12 of the bicycle diverge in a downward direction as shown in Figure 1, preventing the clamp devices 26, 35 from slipping downwardly due to the fact that the horizontal distance between said clamps is maintained at an unchanging rate.

It has been found in practice, during experimental use of the device, that the carrier is characterized by a markedly high efficiency as regards the supporting of loaded newspaper bags, and at the same time, is adapted not only for swift attachment to or detachment from the bicycle, but also is adapted to permit operation of the bicycle without interfering with or being interfered with by the pedals 52, pedal arms 54, drive chain 56, or other components of the bicycle adjacent the carrier.

At the same time, the device is particularly designed to be sold in knock-down form, for shipment in relatively small containers and for convenient and easy assembly by the ultimate purchaser.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In an attachment for a bicycle having a frame that includes a rear frame portion and upper and lower rear stays, a support for an article carrier, comprising: a pair of like, transversely aligned, rectangular frame members spaced apart and lying in vertical planes; an approximately horizontal mounting arm intersecting said planes and extending in approximate perpendicularity thereto, said arm being connected to said frame members at one side of the frame members and having a forward end formed with a rearwardly opening, U-shaped clamping member engageable about the rear frame portion of the bicycle frame; a U-shaped clamping bracket on said arm spaced rearwardly along the same from the clamping member for engagement about the upper rear stay of the bicycle frame; and downwardly opening, hook-shaped rests mounted on the respective frame members at said one side thereof for engagement over the lower rear stay of the bicycle frame.

2. In an attachment for a bicycle having a frame that includes a rear frame portion and upper and lower rear stays, a support frame for an article carrier, comprising: a pair of like, transversely aligned, rectangular frame members spaced apart and lying in vertical planes; an approximately horizontal mounting arm intersecting said planes and extending in approximate perpendicularity thereto, said arm being connected to said frame members at one side of the frame members and having a forward end formed with a rearwardly opening, U-shaped clamping member engageable about the rear frame portion of the bicycle frame; a U-shaped clamping bracket on said arm spaced rearwardly along the same from the clamping member for engagement about the upper rear stay of the bicycle frame; and downwardly opening, hook-shaped rests mounted on the respective frame members at said one side thereof for engagement over the lower rear stay of the bicycle frame, said mounting arm having a longitudinal series of openings, said one side of the respective frame members having vertically extending series of openings with selected openings of the mounting arm being registrable with selected openings of the frame members, whereby to adjust the mounting arm in horizontal and vertical directions in respect to the frame members, the connection of the mounting arm to the frame members comprising bolts passing through the selected, registering openings of the arms and frame members.

3. In an attachment for a bicycle having a frame that includes a rear frame portion and upper and lower rear stays, a support frame for an article carrier, comprising: a pair of like, transversely aligned, rectangular frame members spaced apart and lying in vertical planes; an approximately horizontal mounting arm intersecting said planes and extending in approximate perpendicularity thereto, said arm being connected to said frame members at one side of the frame members and having a forward end formed with a rearwardly opening, U-shaped clamping member engageable about the rear frame portion of the bicycle frame; a U-shaped clamping bracket on said arm spaced rearwardly along the same from the clamping member for engagement about the upper rear stay of the bicycle frame; and downwardly opening, hook-shaped rests mounted on the respective frame members at said one side thereof for engagement over the lower rear stay of the bicycle frame, said mounting arm having a longitudinal series of openings, said one side of the respective frame members having vertically extending series of openings with selected openings of the mounting arm being registrable with selected openings of the frame members, whereby to adjust the mounting arm in horizontal and vertical directions in respect to the frame members, the connection of the mounting arm to the frame members comprising bolts passing through the selected, registering openings of the arms and frame members, said rests each having an opening registrable with a selected opening of the associated frame member, the connection of the rests to the frame members comprising bolts passing through the openings of the rest and frame members, for connection of the rests to the frame members in selected positions of adjustment vertically of the frame members independently of the mounting arm adjustments.

References Cited in the file of this patent

UNITED STATES PATENTS

| | | |
|---|---|---|
| 615,625 | Marley | Dec. 6, 1898 |
| 1,102,159 | Marrs | June 30, 1914 |
| 1,105,435 | Howell | July 28, 1914 |
| 2,704,626 | Meier, Jr. | Mar. 22, 1955 |

FOREIGN PATENTS

| | | |
|---|---|---|
| 370,158 | Italy | Apr. 10, 1939 |
| 656,020 | France | Dec. 24, 1928 |